(12) United States Patent
Kumagai (10) Patent No.: US 10,661,222 B1
(45) Date of Patent: May 26, 2020

(54) FLUE GAS DESULFURIZATION SYSTEM (71) Applicant: CHIYODA CORPORATION, Yokohama-shi, Kanagawa (JP)

(72) Inventor: Kazuya Kumagai, Yokohama (JP)

(73) Assignee: CHYODA CORPORATION, Yokohama-shi (JP)

(*) Notice: Subject to any disclaimer, the term of this patent is extended or adjusted under 35 U.S.C. 154(b) by 198 days.

(21) Appl. No.: 15/780,753

(22) PCT Filed: Nov. 29, 2016

(86) PCT No.: PCT/JP2016/004997
§ 371 (c)(1),
(2) Date: Jun. 1, 2018

(87) PCT Pub. No.: WO2017/098697
PCT Pub. Date: Jun. 15, 2017

(30) Foreign Application Priority Data

Dec. 7, 2015 (JP) ................................. 2015-238290

(51) Int. Cl.
*B01D 53/14* (2006.01)
*B01D 53/78* (2006.01)
(Continued)

(52) U.S. Cl.
CPC ........... *B01D 53/78* (2013.01); *B01D 53/504* (2013.01); *B01D 47/06* (2013.01); *B01D 53/18* (2013.01);
(Continued)

(58) Field of Classification Search
CPC ...... B01D 53/78; B01D 53/504; B01D 47/06; B01D 53/18; B01D 2251/404; B01D 2257/302; B01D 2258/0283
See application file for complete search history.

(56) References Cited

U.S. PATENT DOCUMENTS

| 5,648,048 A | 7/1997 | Kuroda et al. |
| 5,837,213 A * | 11/1998 | Nishino ............... B01D 53/504 423/243.01 |

(Continued)

FOREIGN PATENT DOCUMENTS

| CN | 1142409 A | 2/1997 |
| EP | 0 745 420 A1 | 12/1996 |

(Continued)

OTHER PUBLICATIONS

English translation of Office Action dated Sep. 9, 2019, issued in counterpart KR application No. 10-2018-7019111. (6 pages).
(Continued)

*Primary Examiner* — Cabrena Holecek
(74) *Attorney, Agent, or Firm* — Westerman, Hattori, Daniels & Adrian, LLP (57) ABSTRACT

A flue gas desulfurization system that suppresses accumulation of solids on the bottom surface of the desulfurized flue gas inflow chamber of the system is provided, the system includes an absorber solution chamber so that the flue gas can be blown into the solution, a desulfurized flue gas inflow chamber for receiving the inflow of the desulfurized flue gas, a gas flow pipe penetrating between the absorber solution chamber and the desulfurized flue gas inflow chamber to allow the desulfurized flue gas to pass through the pipe, a cleansing solution feed pipe for feeding cleansing solution into the desulfurized flue gas inflow chamber, and at least one cleansing solution discharge pipe, discharging the fed cleansing solution from the desulfurized flue gas inflow chamber. The desulfurized flue gas inflow chamber has a bottom surface including a protrusion zone having a plurality of protrusions. Each protrusion has an inclined top surface.

10 Claims, 3 Drawing Sheets

(51) Int. Cl.
  *B01D 53/50* (2006.01)
  *B01D 53/18* (2006.01)
  *B01D 47/06* (2006.01)
(52) U.S. Cl.
  CPC .. *B01D 2251/404* (2013.01); *B01D 2257/302* (2013.01); *B01D 2258/0283* (2013.01)

(56) References Cited

U.S. PATENT DOCUMENTS

| | | |
|---|---|---|
| 7,658,897 B2 | 2/2010 | Fleischanderl et al. |
| 2008/0175775 A1 | 7/2008 | Fleischanderl et al. |

FOREIGN PATENT DOCUMENTS

| | | |
|---|---|---|
| EP | 1 866 589 B1 | 9/2009 |
| JP | 8-252423 A | 10/1996 |
| JP | 8-323130 A | 12/1996 |
| JP | 9-866 A | 1/1997 |
| JP | 3621159 B2 | 2/2005 |
| JP | 3734291 B2 | 1/2006 |
| JP | 2014-180656 A | 9/2014 |
| KR | 10-0417671 B1 | 5/2004 |
| TW | 425302 B | 3/2001 |
| TW | 201503949 B | 2/2015 |
| WO | 95/31272 A1 | 11/1995 |
| WO | 00/20089 A1 | 4/2000 |
| WO | 2011/145534 A1 | 11/2011 |
| WO | 2014/196575 A1 | 12/2014 |

OTHER PUBLICATIONS

International Search Report dated Feb. 21, 2017, issued in counterpart International Application No. PCT/JP2016/004997 (2 pages).
Office Action dated Oct. 23, 2017, issued in counterpart of Taiwan Patent Application No. 10621073250 (3 pages).
Extended (Supplementary) European Search Report dated Jul. 9, 2019, issued in counterpart EP application No. 16872599.2. (8 pages).
Office Action dated Sep. 9, 2019, issued in counterpart KR application No. 10-2018-7019111. (6 pages).
Notification of Transmittal of Translation of the International Preliminary Report on Patentability (Form PCT/IB/338) issued in counterpart International Application No. PCT/JP2016/004997 dated Jun. 21, 2018, with Forms PCT/IB/326, PCT/IB/373 and PCT/ISA/237. (11 pages).

\* cited by examiner

FLUE GAS DESULFURIZATION SYSTEM

TECHNICAL FIELD

This invention relates to a flue gas desulfurization system. More specifically, the present invention relates a wet flue gas desulfurization system for removing sulfur oxides in flue gas.

BACKGROUND ART

Combustion exhaust flue gases discharged from coal burning facilities and heavy oil burning facilities such as boilers contain sulfur oxides (Sox). As sulfur oxides pollute the atmosphere and adversely affect the global environment, such facilities are broadly required to install a flue gas desulfurization system for absorbing and removing sulfur oxides from the combustion exhaust flue gas they discharge.

Flue gas desulfurization systems designed to blow sulfur oxides-containing flue gas into an absorbent-containing absorber solution and cause it to bubble for the purpose of desulfurization are being widely adopted because such systems provide a high gas-liquid contact effect and can achieve a high desulfurization efficiency and also a high dust removing efficiency.

In a jet bubbling reactor type flue gas desulfurization system, flue gas is blown into the absorber solution stored in an absorber solution chamber. Then, the sulfur oxides contained in the flue gas are absorbed by the absorber solution and subsequently the desulfurized flue gas is led into a desulfurized flue gas inflow chamber arranged above the absorber solution chamber. In the desulfurized flue gas inflow chamber, liquid droplets and other objects contained in the flue gas are removed before the flue gas is finally discharged from the system. It is known that, in the desulfurized flue gas inflow chamber, solid components (mainly gypsum) contained in the liquid droplets that accompany the flue gas led into the desulfurized flue gas inflow chamber settle there and accumulate on the bottom surface of the desulfurized gas inflow chamber.

Known techniques for washing out the accumulated solid components include, for example, a method of supplying cleansing solution into the desulfurized flue gas inflow chamber and flushing down the solid components through a down comer along with the cleansing solution. However, as the cleansing solution is discharged into the absorber solution chamber, the surface level of the absorber solution fluctuates as a function of the flow rate of the cleansing solution that comes flowing down through the down comer. Then, as a result, the desulfurization performance can become instable in some instances.

In view of the above-identified problem, PTL 1 describes a flue gas desulfurization system in which cleansing solution is fed into a desulfurized flue gas inflow chamber in order to cleanse and remove the accumulated solid components and then the cleansing solution is discharged from the desulfurized flue gas inflow chamber to the outside of the system along with the solid components by way of a cleansing solution discharge pipe. According to PTL 1, the flue gas desulfurization system described in it discharges the cleansing solution from the desulfurized flue gas inflow chamber to the outside of the flue gas desulfurization system so that it can eliminate any external turbulence that can fluctuate the surface level of the absorber solution in the absorber solution chamber and thereby stabilize the desulfurization performance of the system.

CITATION LIST

Patent Literature

PTL 1: Japanese Patent No. 3,734,291

SUMMARY OF INVENTION

Technical Problem

However, even in a flue gas desulfurization system as described in PTL 1, solid components can accumulate on the bottom surface of the desulfurized flue gas inflow chamber typically between a number of cleansing solution discharge pipes so that periodical servicing operations are required to remove the solid components accumulated on the bottom surface of the desulfurized flue gas inflow chamber.

In view of the above-identified problems of the prior art, it is therefore the object of the present invention to provide a flue gas desulfurization system that can suppress any accumulation of solids on the bottom surface of the desulfurized flue gas inflow chamber of the system and hence shows a remarkable advantage in terms of maintenance.

Solution to Problem

A flue gas desulfurization system for removing sulfur oxides from flue gas containing sulfur oxides according to the present invention comprises an absorber solution chamber which stores absorber solution so that the flue gas can be blown into the solution, a desulfurized flue gas inflow chamber for receiving the flue gas desulfurized in the absorber solution chamber and flowing therefrom, a gas flow pipe penetrating between the absorber solution chamber and the desulfurized flue gas inflow chamber so as to allow the desulfurized flue gas to pass through the pipe, a cleansing solution feed pipe for feeding cleansing solution into the desulfurized flue gas inflow chamber, and at least one cleansing solution discharge pipe for discharging the fed cleansing solution from the desulfurized flue gas inflow chamber, the desulfurized flue gas inflow chamber having a bottom surface including a protrusion zone having a plurality of protrusions formed therein, each of the protrusions having a top surface at least part of which is inclined relative to the horizontal, the protrusion zone being located at a position lower than an adjacent surrounding area on the bottom surface of the desulfurized flue gas inflow chamber, the at least one cleansing solution discharge pipe being respectively arranged between two adjacently located ones of the protrusions.

Advantageous Effects of Invention

Thus, the present invention provides a flue gas desulfurization system that can suppress any accumulation of solids on the bottom surface of the desulfurized flue gas inflow chamber of the system and hence shows a remarkable advantage in terms of maintenance.

DESCRIPTION OF EMBODIMENTS

Now, a currently preferred embodiment of flue gas desulfurization system according to the present invention will be described below by referring to the accompanying drawings.

Note here that, while the embodiment that will be described hereinafter is a currently preferred one and involves various technical limitations, the scope of the present invention is by no means limited by the embodiment unless specifically noted otherwise hereinafter.

(General Description of Flue Gas Desulfurization System)

A flue gas desulfurization system according to the present invention is a wet flue gas desulfurization system, which is also referred to as jet bubbling reactor (JBR) type flue gas desulfurization system, that desulfurizes sulfur oxides-containing combustion exhaust flue gas (gas to be treated) by means of a gas-phase dispersion type gas-liquid contacting device and an absorber solution containing an alkali agent. In a jet bubbling reactor type system, absorber solution for removing sulfur oxides is contained in a bottom part of a sealed vessel, which is a reaction vessel, and flue gas and air (oxygen) are introduced into the absorber solution to cause gas-liquid contact of the sulfur oxides in flue gas and the liquid alkali agent in the absorber solution to take place in the presence of oxygen and make them react with each other, while forming a jet bubbling layer (froth layer).

Sulfur oxides (SOx) to be treated by this embodiment typically include sulfur dioxide. Sulfur dioxide can take various forms including sulfurous acid gas and aqueous solution of sulfurous acid gas. For example, sulfur dioxide is produced particularly when sulfurous gas is dissolved in water. Sulfur oxides-containing combustion exhaust flue gas (exhaust gas) is typically emitted from furnaces and power generation plants where coal is burnt.

As is well known, as sulfur oxides such as $SO_2$ contained in flue gas is made to react with an alkali agent and oxygen, hardly soluble solids are produced and sulfur oxides are removed from the flue gas. For instance, when $SO_2$ as sulfur oxides is contained in flue gas and limestone ($CaCO_3$) is employed as alkali agent for desulfurization, a reaction expressed by formula (1) shown below takes place to produce gypsum ($CaSO_4 \cdot 2H_2O$) so that $SO_2$ can be removed from flue gas.

$$SO_2 + 2H_2O + \tfrac{1}{2}O_2 + CaCO_3 \rightarrow CaSO_4 \cdot 2H_2O + CO_2 \qquad (1)$$

Note that flue gas contains not only sulfur oxides but also soot and dust (powder dust). Just like sulfur oxides, the soot and dust contained in flue gas to be treated are also removed as flue gas and absorber solution are brought into gas-liquid contact in the froth layer of the flue gas desulfurization system. More specifically, the soot and dust contained in flue gas is removed as flue gas and the cleansing solution are brought into gas-liquid contact as will be described in detail hereinafter.

(Overall Configuration of Flue Gas Desulfurization System)

Figure 1:
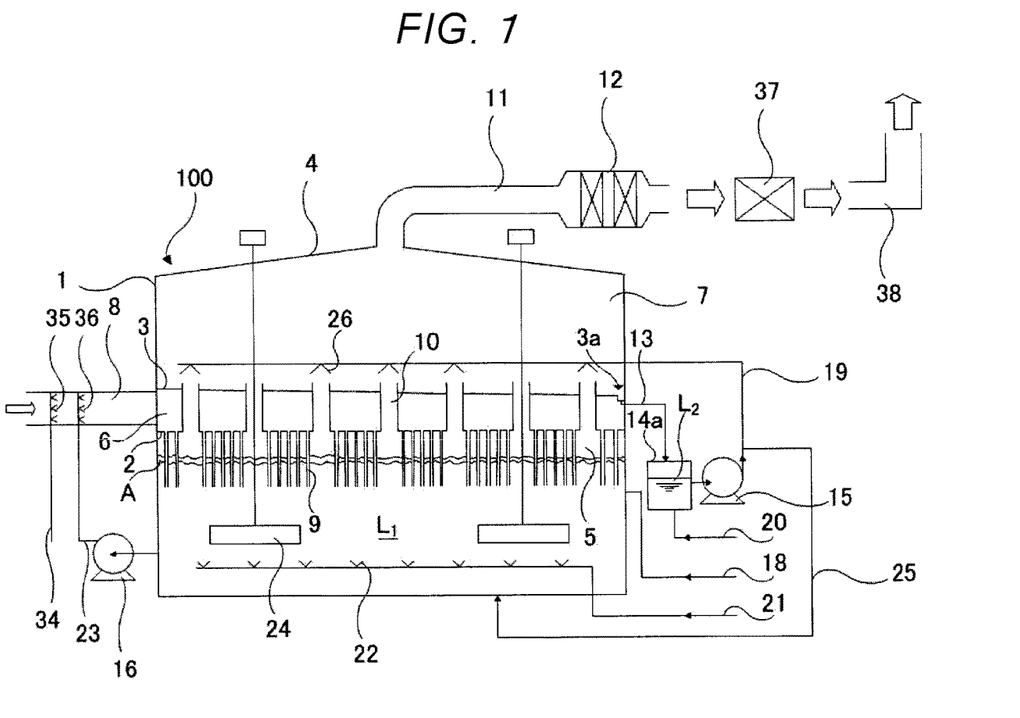
FIG. 1 is a schematic cross-sectional view of an embodiment of flue gas desulfurization system according to the present invention, illustrating the configuration thereof.

FIG. 1 is a schematic cross-sectional view of an embodiment of flue gas desulfurization system according to the present invention, illustrating the configuration thereof.

The flue gas desulfurization system 100 of this embodiment comprises a large-size sealed vessel 1, in which sulfur oxides and dust are removed from flue gas that contains sulfur oxides and dust.

In the inside of the sealed vessel 1, absorber solution chamber 5, flue gas lead-in chamber 6, which is located adjacent to and above the absorber solution chamber 5, and desulfurized flue gas inflow chamber 7, which is by turn located adjacent to and above the flue gas lead-in chamber 6, are separated from each other by means of first partition board 2 and second partition board 3 located above the first partition board 2. More specifically, the first partition board 2 operates both as the ceiling board of the absorber solution chamber 5 and as the bottom plate of the flue gas lead-in chamber 6 and separates the absorber solution chamber 5 and the flue gas lead-in chamber 6. On the other hand, the second partition board 3 operates both as the ceiling board of the flue gas lead-in chamber 6 and as the bottom plate of the desulfurized flue gas inflow chamber 7 and separates the flue gas lead-in chamber 6 and the desulfurized flue gas inflow chamber 7. The upper space in the desulfurized flue gas inflow chamber 7 is sealed by ceiling board 4.

While the flue gas lead-in chamber 6 is arranged between the absorber solution chamber 5 and the desulfurized flue gas inflow chamber 7 in this embodiment of flue gas desulfurization system, other arrangement may alternatively be adopted to introduce flue gas into the sealed vessel 1.

(First Partition Board, Second Partition Board)

The first partition board 2 is a substantially horizontal board.

The second partition board 3 operates as the bottom plate of the desulfurized flue gas inflow chamber 7 and includes a number of protrusions 3b and a protrusion zone 3a where the plurality of protrusions 3b are formed. The profile of the second partition board 3 is not subject to any particular limitations. The second partition board 3 will be described in greater detail hereinafter.

(Flue Gas Lead-in Chamber, Flue Gas Cooling Device)

The peripheral wall of the flue gas lead-in chamber 6 is provided with a flue gas inlet. A flue gas lead-in duct 8 is coupled to the flue gas inlet.

Absorber solution $L_1$ that is contained in the absorber solution chamber 5, which will be described in greater detail hereinafter, is sprayed into the flue gas lead-in duct 8 from absorber solution nozzle 36 by way of absorber solution extraction pipe 23. Absorber solution $L_1$ is drawn out from the absorber solution chamber 5 by means of a circulation pump 16 and fed into the absorber solution extraction pipe 23.

Additionally, industrial water that is supplied from an industrial water source (not shown) is sprayed out from industrial water nozzle 35 by way of industrial water pipe 34.

More specifically, in this embodiment, a flue gas cooling device is coupled to a flue gas inlet arranged at the peripheral wall of the sealed vessel 1 and the flue gas that is cooled by the flue gas cooling device (and additionally subjected to a dust removal operation and a desulfurization operation to some extent) is led into the sealed vessel 1 by way of the flue gas inlet. In this embodiment, the flue gas cooling device comprises the flue gas lead-in duct 8, the circulation pump 16, the industrial water pipe 34, the industrial water nozzle 35, the absorber solution extraction pipe 23 and the absorber solution nozzle 36, although the makeup of the flue gas cooling device is not limited to such an arrangement. In other words, the makeup of the flue gas cooling device is not subject to any particular limitations so long as it is so arranged as to be able to cool the flue gas that is led into it. For example, the flue gas cooling device may comprise only either the industrial water nozzle 35 or the absorber solution nozzle 36 and may additionally comprise some other cooling mechanism.

While no additional unit needs to be installed in the space in the flue gas lead-in chamber 6, if desired, a spray nozzle (not shown) for spraying absorber solution $L_1$ may be installed in the space. When absorber solution $L_1$ is to be sprayed into the space of the flue gas lead-in chamber 6, absorber solution $L_1$ contained in the absorber solution chamber 5 can be fed into the flue gas lead-in chamber 6 by branching the absorber solution extraction pipe 23.

(Through Holes, Flue Gas Dispersion Pipes)

The first partition board 2 is provided with a large number of through holes that allow the absorber solution chamber 5 and the flue gas lead-in chamber 6 to communicate with each other. A large number of flue gas dispersion pipes 9 extend downward from the respective through holes in order to cause the flue gas fed into the flue gas lead-in chamber 6 to disperse in the absorber solution $L_1$ contained in the absorber solution chamber 5. More specifically, the flue gas dispersion pipes 9 are arranged to extend downward from the respective through holes so as to make the front tips of the flue gas dispersion pipes 9 dip into the absorber solution $L_1$ contained in the absorber solution chamber 5. Thus, the flue gas that is led into the flue gas lead-in chamber 6 is then blown into the absorber solution $L_1$ contained in the absorber solution chamber 5 by way of the flue gas dispersion pipes 9.

Each of the flue gas dispersion pipes 9 is provided at the peripheral wall thereof with one or more than one dispersion holes for discharging flue gas, which one or more than one dispersion holes are arranged in the region of the pipe located below the surface level of the absorber solution $L_1$ in the absorber solution chamber 5. Preferably, each of the flue gas dispersion pipes 9 is provided with a plurality of dispersion holes.

The profile and the positional arrangement of the dispersion holes are not subject to any particular limitations so long as they can effectively and excellently disperse flue gas in the absorber solution $L_1$ contained in the absorber solution chamber 5. An exemplar arrangement may be such that the dispersion holes of each of the flue gas dispersion pipes 9, which are cylindrical pipes, show a circular cross section and are arranged at positions separated from the bottom ends of the flue gas dispersion pipes 9 by a predetermined distance in the direction perpendicular to the extending direction of the dispersion pipe 9, any two adjacently located dispersion holes of each of the dispersion pipes 9 being separated by an angle of 30° as viewed from the central axis of the dispersion pipe 9 (so that a total of 12 dispersion holes are arranged at angularly regular intervals in the direction perpendicular to the extending direction of the flue gas dispersion pipe 9).

(Absorber Solution Chamber)

Absorber solution $L_1$ is contained in the absorber solution chamber 5. Absorber solution $L_1$ is fed into the absorber solution chamber 5 by way of absorber solution feed pipe 18.

Absorber solution $L_1$ of this embodiment contains an alkali agent. The alkali agent contained in the absorber solution $L_1$ is a neutralizer agent for neutralizing acid. Examples of such neutralizer agents include calcium carbonate (limestone) and sodium hydroxide. The solvent to be used for alkali agent-containing absorber solution that can be used for this embodiment may typically be water.

Note, however, absorber solution $L_1$ is not subject to any particular limitations so long as it can absorb sulfur oxides.

Stirrers 24 and oxygen-containing gas spouting jet nozzles 22 to be used, whenever necessary, for supplying oxygen into the absorber solution $L_1$ in the absorber solution chamber 5 are arranged in the absorber solution chamber 5.

The oxygen-containing gas spouting jet nozzles 22 supply air (oxygen) to the alkali agent-containing absorber solution $L_1$ and also to the flue gas in the absorber solution chamber 5. Air is supplied to the oxygen-containing gas spouting jet nozzles 22 from a feed blower (not shown) by way of an oxygen-containing gas feed pipe 21. It is sufficient for the oxygen-containing gas spouting jet nozzles 22 that they can only supply oxygen-containing gas (gas for oxidation) and not air but only oxygen or any gas other than air that contains oxygen may alternatively be supplied to the jet nozzles 22.

As described above, flue gas is blown into the absorber solution $L_1$ from the flue gas lead-in chamber 6 by way of the flue gas dispersion pipes 9. The flue gas that is blown into the absorber solution $L_1$ then moves upward in the absorber solution $L_1$ contained in the absorber solution chamber 5 as bubbles. Thus, a froth layer A in a mixed phase of bubbles and absorber solution $L_1$ is formed immediately above the level of the dispersion holes of the flue gas dispersion pipes 9 in the absorber solution chamber 5. While flue gas moves up in the absorber solution $L_1$ as bubbles and while flue gas stays in the froth layer A as bubbles, the dust and the sulfur oxides contained in the flue gas are seized in the absorber solution $L_1$ and then removed from the flue gas.

The flue gas that is cleansed (desulfurized) in the above-described manner is then allowed to move upward from the froth layer A and dissipate into the upper space. Thereafter, it is led into the desulfurized flue gas inflow chamber 7 by way of gas flow pipes 10, which will be described in greater detail hereinafter.

(Apertures, Gas Flow Pipes)

The first partition board 2 and the second partition board 3 are provided with the same number of apertures. The apertures of the first partition board 2 are arranged squarely vis-à-vis the corresponding respective apertures of the second partition boards 3 to form so many aperture pairs. A gas flow pipe 10 is arranged to connect each of the aperture pairs so as to close the inner space of the flue gas lead-in chamber 6 and hold the absorber solution chamber 5 and the desulfurized flue gas inflow chamber 7 in communication with each other. The gas flow pipes 10 allow the desulfurized flue gas staying in the upper space of the absorber solution chamber 5 to be led into the desulfurized flue gas inflow chamber 7.

The upper ends of the gas flow pipes 10 project upward from the top surface of the second partition board 3 that surrounds them (and hence from the bottom surface of the desulfurized flue gas inflow chamber 7) so as to prevent the cleansing solution $L_2$ located on the second partition board 3 from flowing down into the absorber solution chamber 5 by way of the gas flow pipes 10.

The horizontal cross section of each of the gas flow pipes 10 may be of any shape such as circular, square or rectangular.

(Desulfurized Flue Gas Inflow Chamber)

A gas flow blocking plate 26 is arranged above the gas flow pipes 10 in the desulfurized flue gas inflow chamber 7 so as to block the desulfurized flue gas flowing out from the gas flow pipes 10.

The ceiling board 4 arranged at the top of the desulfurized flue gas inflow chamber 7 is provided with a desulfurized flue gas outlet and a desulfurized flue gas lead-out duct 11 is coupled to the desulfurized flue gas outlet.

Note that the desulfurized flue gas outlet may alternatively be arranged at the peripheral wall of the desulfurized flue gas inflow chamber 7.

As the desulfurized flue gas flowing out from the gas flow pipes 10 collides with the gas flow blocking plate 26, the liquid droplets and the solid components, which mainly contain gypsum and are contained in the liquid droplets, that accompany the desulfurized flue gas stick to the gas flow blocking plate 26 and separated from the desulfurized flue gas. On the other hand, the liquid droplets and the solid components, which mainly contain gypsum and are contained in the desulfurized flue gas that directly flows out between the gas flow pipes 10 and the gas flow blocking plate 26, falls down onto the bottom surface of the desulfurized flue gas inflow chamber 7 (namely onto the top surface of the second partition board 3) by their own weights before they get to the desulfurized flue gas outlet.

(Cleansing Solution Feed Pipe)

Furthermore, cleansing solution $L_2$ is ejected from cleansing solution feed pipe 19 into the space between the gas flow pipes 10 and the gas flow blocking plate 26. The ejected cleansing solution is forced to form a film-like liquid flow there by the cleansing solution feed pipe 19 and a liquid dispersion plate (not shown) in this embodiment. Then, the liquid droplets that accompany the desulfurized flue gas flowing out from between the gas flow pipes 10 and the gas flow blocking plate 26 and the solid components, which mainly contain gypsum and are contained in the liquid droplets, are efficiently removed from the desulfurized flue gas and collected on the bottom surface of the desulfurized flue gas inflow chamber 7 as they are caught by the cleansing solution $L_2$ in the form of a film-like liquid flow.

Note that the method of supplying cleansing solution $L_2$ for the purpose of the present invention is not subject to any particular limitations. In other words, any method may be used to supply cleansing solution $L_2$ so long as the supplied cleansing solution $L_2$ can satisfactorily wash out the solid components accumulated on the top surface of the second partition board 3. Note, however, that cleansing solution $L_2$ is preferably supplied in such a manner that it cannot only simply wash out the top surface of the second partition board 3 but also catch the liquid droplets accompanying the desulfurized flue gas flowing out from the gas flow pipes 10 and the solid components that mainly contain gypsum and are contained in the liquid droplets (typically by means of the above-described film-like liquid flow).

Any cleansing solution $L_2$ can be used for the purpose of the present invention so long as it is liquid. For example, the filtrate obtained by filtering the gypsum that is collected from the absorber solution chamber 5 or absorber solution $L_1$ may be used as cleansing solution $L_2$. Alternatively, water, sea water or some other liquid that is easily available may be used as cleansing solution $L_2$. However, the use of water is preferable because no dust is produced if water droplets remain in the treated desulfurized flue gas.

(Details of Second Partition Board)

Now, the second partition board 3 of this embodiment that includes a protrusion zone 3a and protrusions 3b will be described below in greater detail.

Figure 2:
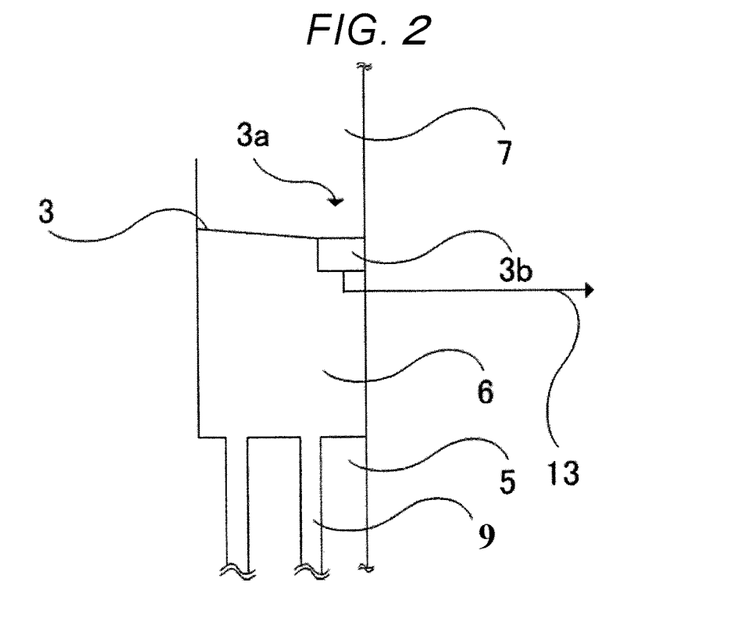
FIG. 2 is an enlarged schematic illustration of the protrusion zone as shown in FIG. 1.
Figure 3:
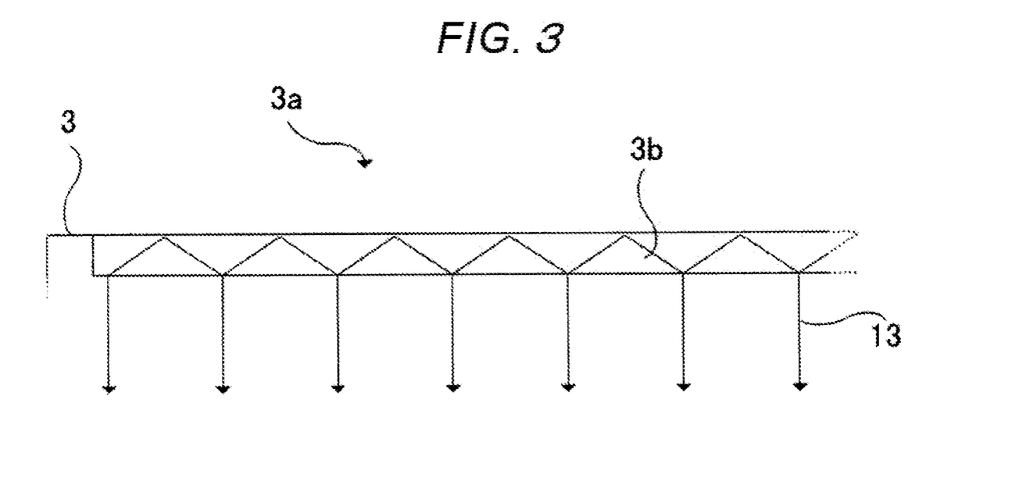
FIG. 3 is a schematic partial lateral view of the protrusion zone of the embodiment of flue gas desulfurization system of the present invention as shown in FIG. 1, illustrating the configuration thereof.
Figure 4:
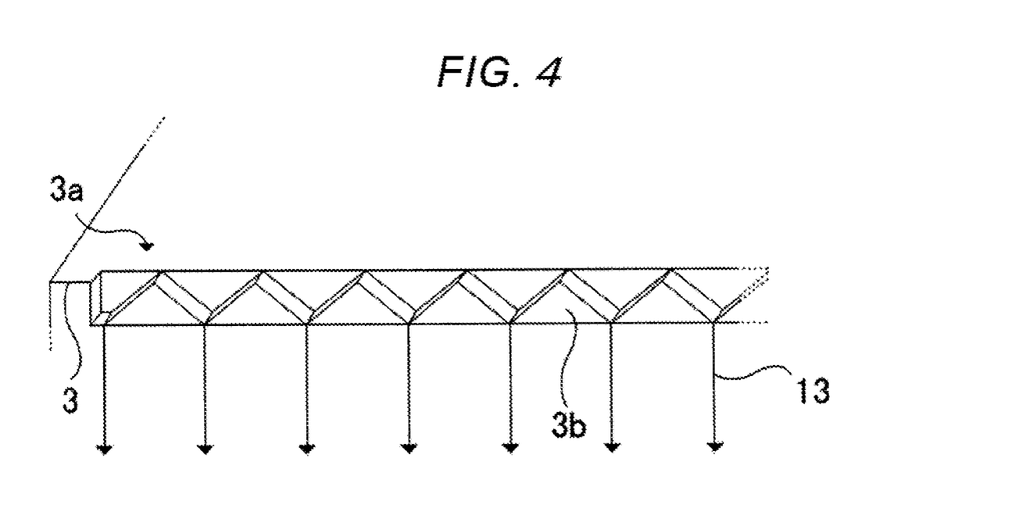
FIG. 4 is a schematic partial perspective view of the protrusion zone of the embodiment of flue gas desulfurization system of the present invention as shown in FIG. 1, illustrating the configuration thereof.

FIG. 2 is an enlarged schematic illustration of the protrusion zone 3a and its peripheral area shown in FIG. 1. FIG. 3 is a schematic partial lateral view of the protrusion zone 3a of this embodiment of flue gas desulfurization system according to the present invention, illustrating the configuration thereof. Note that the peripheral wall of the flue gas lead-in chamber 7 is omitted from FIG. 3 for the purpose of easy understanding of the following description. Also note that FIG. 3 is horizontally orthogonal relative to FIGS. 1 and 2. FIG. 4 is a schematic partial perspective view of the protrusion zone 3a of the embodiment of flue gas desulfurization system according to the present invention as shown in FIG. 3, schematically illustrating the configuration of the protrusion zone 3a. Note that, in FIGS. 3 and 4, the angle of inclination of the protrusions 3b is exaggerated for the purpose of easy understanding of the arrangement of the protrusions 3b.

The second partition board 3 operates as the bottom plate of the desulfurized flue gas inflow chamber 7 and, as described above, includes a plurality of protrusions 3b and a protrusion zone 3a where the plurality of protrusions 3b are formed.

The second partition board 3 of this embodiment is a plate that is inclined by 3° relative to the horizontal and includes a plurality of protrusions 3b and a protrusion zone where the protrusions 3b are arranged. The protrusion zone 3a is located at the lower end of the slope of the second partition board 3.

Thus, the protrusion zone 3a is lower than the remaining part of the second partition board 3 and the plurality of protrusions 3b are formed there.

In this embodiment, the protrusion zone 3a is a U-shaped gutter-like zone that is located at the lower end of the slope of the second partition board 3 and hence the protrusion zone 3a is the lowest part of the second partition board 3. Additionally, as shown in FIG. 3, each of the protrusions 3b of this embodiment shows an isosceles triangular profile as viewed from a lateral side. More specifically, as shown in FIG. 4, each of the protrusions 3b is a three-dimensional object having a shape of a triangular prism formed by a pair of isosceles triangles and three rectangles and arranged in the protrusion zone 3a, of which one of its side surfaces (the rectangular side surfaces) operates as the bottom surface and the remaining two side surfaces (the rectangular side surfaces) operate as slopes. A plurality of protrusions 3b having the same profile are arranged side by side as shown in FIG. 3 with their slopes facing each other just like so many saw teeth in the protrusion zone 3a.

(Cleansing Solution Discharge Pipes)

A cleansing solution discharge pipe 13 is arranged between any two adjacently located protrusions 3b. Thus, the cleansing solution $L_2$ and the solid components contained therein that flows down the mutually facing slopes of any two adjacently located protrusions 3b gets to the lower ends of the mutually facing slopes of the two protrusions and then becomes discharged to the outside of the sealed vessel 1 by way of the cleansing solution discharge pipe 13.

In this embodiment, a cleansing solution discharge pipe 13 is arranged between any two adjacently located protrusions 3b. Note that a cleansing solution discharge pipe 13 is also arranged between the protrusion 3b at the left end in FIG. 3 and the adjacently located lateral wall of the U-shaped gutter-like zone (the lateral wall of the gutter-like protrusion zone 3a) and another cleansing solution discharge pipe 13 is arranged between the protrusion at the right end (not shown) and the adjacently located lateral wall of the U-shaped gutter-like zone (the lateral wall of the gutter-like protrusion zone 3a). In this embodiment, the cleansing solution discharge pipes 13 are arranged so as to discharge cleansing solution $L_2$ vertically downward from the desulfurized flue gas inflow chamber 7. Note, however, the present invention is by no means limited to such an arrangement of cleansing solution discharge pipes 13. In other words, the cleansing solution discharge pipes 13 may be arranged so as to show an angle relative to the horizontal between the horizontal direction and the vertical direction. However, the cleansing solution discharge pipes 13 may advantageously be free from clogging when they are arranged vertically downwardly or nearly vertically downwardly.

As for the shape of the cleansing solution discharge pipes 13, they may be of any tubular form. For example, the cleansing solution discharge pipes 13 may be circular pipes or square pipes.

Note that preferably more than one cleansing solution discharge pipe 13 are provided. More specifically, preferably the protrusion zone 3a includes three or more than three protrusions 3b and a cleansing solution discharge pipe 13 is arranged between any two of the adjacently located protrusions 3b.

When a plurality of cleansing solution discharge pipes 13 are arranged relative to the second partition board 3, clogging of the cleansing solution discharge pipes 13 caused by solid components can advantageously be prevented from taking place. If only a single cleansing solution discharge pipe 13 is provided relative to the second partition board 3, the pipe 13 is required to have a large pipe diameter.

When a plurality of cleansing solution discharge pipes 13 are provided, any adjacently located cleansing solution pipes 13 are preferably separated from each other by a distance not less than 300 mm and not more than 5,000 mm.

(External Structure of Sealed Vessel)

The desulfurized flue gas in the desulfurized flue gas inflow chamber 7 is drawn out to the outside of the desulfurized flue gas inflow chamber 7 (of the sealed vessel 1) by way of desulfurized flue gas lead-out duct 11. Thereafter, the flue gas (desulfurized flue gas) drawn out from the desulfurized flue gas inflow chamber 7 is led into mist eliminator 12, in which mist eliminator 12 the absorber solution $L_1$, the particles in the cleansing solution $L_2$ and other components that are contained in the flue gas are further removed. Then, the desulfurized flue gas discharged from the mist eliminator 12 gets into heater 37, in which heater 37 the mist remaining in the desulfurized flue gas is gasified and then discharged into the atmosphere by way of flue gas chimney 38.

A circulation line for causing the cleansing solution $L_2$ that is supplied onto the second partition board 3 (the bottom surface of the desulfurized flue gas inflow chamber 7) and collected in the cleansing solution discharge pipe 13 to circulate through the desulfurized flue gas inflow chamber 7 is arranged outside the sealed vessel 1. The circulation line comprises the cleansing solution discharge pipes 13 for drawing out the cleansing solution $L_2$ fed onto the second partition board 3, cleansing solution tank 14a for storing the drawn out cleansing solution $L_2$, circulation pump 15 for circulating the cleansing solution $L_2$ from the cleansing solution tank 14a and cleansing solution feed pipe 19 coupled to the circulation pump 15 to feed the cleansing solution $L_2$ into the desulfurized flue gas inflow chamber 7. The cleansing solution tank 14a is coupled to cleansing solution replenishing pipe 20 for replenishing cleansing solution so that cleansing solution is replenished by way of the cleansing solution replenishing pipe 20.

Preferably, part of the cleansing solution $L_2$ that is circulated into the desulfurized flue gas inflow chamber 7 is led into the absorber solution $L_1$ by way of conduit 25 branched from the cleansing solution feed pipe 19. With such a cleansing solution $L_2$ lead-in operation, the component composition of the cleansing solution $L_2$ circulating into the desulfurized flue gas inflow chamber 7 can be held within a predetermined range and hence the solid component removing capability of the cleansing solution $L_2$ can be maintained at a high level.

The cleansing solution tank 14a operates to temporarily store the cleansing solution $L_2$ fed into the desulfurized flue gas inflow chamber 7 and at the same time to receive and store the cleansing solution for replenishment.

Note that the installation of the cleansing solution tank 14a is not indispensably required. In other words, the cleansing solution tank 14a may be omitted and the cleansing solution discharge pipe 13 may be directly coupled to the circulation pump 15. In the instance of the latter arrangement, the cleansing solution replenishing pipe 20 is coupled to the cleansing solution discharge pipe 13 or the cleansing solution feed pipe 19 so as to directly supply the cleansing solution for replenishment.

Since cleansing solution $L_2$ is delivered to the outside of the sealed vessel 1 and caused to circulate in this embodiment, it provides an operational advantage of easy adjustment of the surface level of the absorber solution $L_1$ in the absorber solution chamber 5 and, at the same time, stably securing a high desulfurization performance, if compared, for instance, with systems in which cleansing solution $L_2$ is caused to flow into the absorber solution chamber 5 through a down comer.

(Flow Rate of Cleansing Solution)

The flow rate of cleansing solution $L_2$ fed into the desulfurized flue gas inflow chamber 7 per unit volume of flue gas to be treated by cleansing solution $L_2$ is preferably not less than 0.1 $1/m^3N$ and not more than 1.0 $1/m^3N$, more preferably not less than 0.2 $1/m^3N$ and not more than 0.8 $1/m^3N$, although the flow rate may vary as a function of the scale of the flue gas desulfurization system. While cleansing solution $L_2$ may be supplied intermittently, preferably cleansing solution $L_2$ is supplied continuously in order to suppress accumulation of solid components.

(Exemplar Modification of Second Partition Board 1: Flat Plate)

When the second partition board 3 (the bottom plate of the desulfurized flue gas inflow chamber 7) is a plate whose top surface is flat, it is arranged substantially horizontally or, alternatively, it is arranged so as to be inclined relative to the horizontal. The second partition board 3 that is arranged so as to be inclined relative to the horizontal provides an advantage that cleansing solution $L_2$ can easily be collected in the protrusion zone 3a (the cleansing solution discharge pipes 13) provided at the lower end of the slope of the inclined second partition board 3.

As for the specific shape of the second partition board 3, it may show, for example, a circular, rectangular or square profile. A large rectangular or square second partition board 3 can be formed typically by combining a plurality of relatively small square plate modules. In other words, a large partition board 3 can be formed by using a plurality of same modules to reduce the cost of manufacturing the second partition board 3. Additionally, when the second partition board 3 is formed by combining a plurality of same modules, second partition boards having different surface area can be produced by using same modules so that the use of such modules provide an advantage of versatility if compared with partition boards exclusively designed for a particular application. In other words, the use of such modules greatly broadens the scope of applicability.

The protrusion zone 3a of the second partition board 3 may take only a part of the lower end zone of the second partition board 3 or take all the lower end zone of the second partition board 3. When the protrusion zone 3a takes only a part of the lower end zone of the second partition board 3, the protrusion zone 3a of the second partition board 3 preferably occupies not less than ¼ and not more than ⅓ of the length of the peripheral wall of the desulfurized flue gas inflow chamber 7.

When, for example, the second partition board 3 is rectangular or square of shape, the protrusion zone 3a may be arranged only along one of the sides thereof or, alternatively along all the four sides thereof. When the protrusion zone 3a is arranged only along one of the sides of the second partition board 3, the second partition board 3 is preferably inclined such that the protrusion zone 3a is located at the lower end of the second partition board 3.

When, on the other hand, the second partition board 3 is circular of shape, the protrusion zone 3a may be arranged only at a part of the circumference of the circular second partition board 3 or, alternatively, along all the circumference of the board 3.

The protrusion zone 3a that takes at least only part of the periphery of the second partition board 3 provides an advantage of facilitating the piping arrangement of the cleansing solution discharge pipes 13 that are arranged at the protrusion zone 3a even when the flue gas desulfurization system is so designed that cleansing solution $L_2$ is drawn out to the outside of the sealed vessel 1.

When the protrusion zone 3a is arranged at an end of the second partition board 3, the protrusion zone 3a is held in contact with the peripheral wall of the desulfurized flue gas inflow chamber 7 and surrounded by the peripheral wall of the desulfurized flue gas inflow chamber 7 and the periphery of the second partition board 3 in such a way that the protrusion zone 3a is located lower than the surrounding members.

Note that servicing persons will get into the top surface of the second partition board 3 for servicing operations. If the second partition board 3 is arranged to show a steep slope, the steep slope of the partition board 3 can make it difficult for the servicing persons to operate on the top surface of the second partition board 3. Thus, the angle of inclination of the second partition board 3 is preferably not greater than 5°, more preferably not smaller than 1° and not greater than 5° relative to the horizontal.

(Exemplar Modification of Second Partition Board 2: Non-Flat Plate)

When the second partition board 3 has an inclined surface that is inclined relative to the horizontal, it may not necessarily be formed by a single inclined flat surface that is inclined relative to the horizontal. In other words, the second partition board 3 may be of any shape so long as its top surface is a non-flat surface and has a slope at least as part thereof. For example, the top surface of the second partition board 3 may show a semispherical profile (a board having only a semispherical lateral surface), a conical profile (a board having only a conical lateral surface; an umbrella-like lateral surface), a pyramidal profile (a board having only pyramidal lateral surfaces), a gutter-like U-shaped profile, a profile produced by inverting any of the above-listed ones, an inverted V-shapes profile formed by connecting two rectangular plate-like members at a side of each of them or of any other profile formed by combining a plurality of plate-like members.

In order to obtain thrust for driving cleansing solution $L_2$ to fall down on the surface of the second partition board 3 toward the protrusion zone 3a in the direction of the fall of cleansing solution $L_2$, the second partition board 3 is required to have a slope that is inclined by a predetermined angle of inclination $\theta_1$ relative to the horizontal.

When the second partition board 3 is formed by using a board having a single flat surface, the angle of inclination $\theta_1$ can be produced for the second partition board 3 by tilting the flat surface by the angle of inclination $\theta_1$. If the horizontal distance from the top to the bottom of the second partition board 3 is $r_1$, the height of the second partition board 3 is determined by $r_1 \cdot \tan \theta_1$. Then, the system is required to accommodate the height of the above determined height of the second partition board 3.

When, on the other hand, the second partition board 3 is formed by using a board having a circular conical surface (like an umbrella) and having an angle of inclination $\theta_1$, the horizontal distance from the top to the bottom of the second partition board 3 is $r_2=r_1/2$. Then, the height of the second partition board 3 is determined by $(r_1 \cdot \tan \theta_1)/2$, which is a half of the height of the second partition board 3 formed by using a board having a single flat surface. Therefore, the use of a second partition board 3 having a circular conical surface can reduce the height that the system is required to accommodate. Thus, a compact and low profile flue gas desulfurization system 100 can be realized by using a second partition board 3 having a circular conical surface.

Note, however, the use of a second partition board 3 having a non-flat and hence complex profile requires a high manufacturing cost. On the other hand, the use of a high profile second partition board 3 also requires a high manufacturing cost. Thus, if a second partition board having a flat surface is to be used or a second partition board having a non-flat surface is to be used is a matter of offset. Therefore, the design of the flue gas desulfurization system is required to take the installation area, the required angle of inclination $\theta_1$ of the second partition board 3 and other factors into consideration in a well-balanced manner.

The angle of inclination $\theta_1$ of this second exemplar modified second partition board 3 is also preferably show an angle of inclination $\theta_1$ of not greater than 5°, more preferably not smaller than 1° and not greater than 5° relative to the horizontal.

Additionally, with this second exemplar modified second partition board 3, if the second partition board 3 shows a profile having an edge portion located lower than the remaining part thereof, the protrusion zone 3a of the second partition board may only take a part of the edge portion or, alternatively may take all the edge portion. When the protrusion zone 3a takes only a part of the edge portion, the second partition board 3 preferably has a protrusion zone 3a extending over not less than ¼ and not more than ⅓ of the peripheral wall of the desulfurized flue gas inflow chamber 7.

(Exemplar Modification of Protrusion Zone)

The protrusion zone 3a may take any profile so long as it is located lower than any other part of the second partition board 3. Preferable profiles of the protrusion zone 3a include a concave profile and a sloped profile in addition to the above-described gutter-shaped profile.

(Exemplar Modification of Protrusion)

The protrusions 3b may show any profile so long as each of them has a surface area that is inclined relative to the horizontal at least as part of its entire surface and the inclined surface area allows cleansing solution $L_2$ to flow down along it so as to be collected in the cleansing solution discharge pipes 13, although the protrusions 3*b* preferably show a profile having no horizontal planar surface area and hence having only an inclined surface. Specific examples of the profile of the protrusions 3*b* include a semispherical profile, a conical profile, a pyramidal profile, an inverted-gutter-shaped profile, an inverted V-shaped profile formed by connecting two rectangular plate-like members at a side of each of them or any other profile formed by combining a plurality of plate-like members as well as a profile of a plane tilted relative to the horizontal.

A number of protrusions 3*b* are arranged in the protrusion zone 3*a*. The protrusions 3*b* preferably show substantially the same profile. More preferably, a number of protrusions 3*b* having substantially the same profile are arranged in the protrusion zone 3*a* with their slopes facing each other just like so many saw teeth in the protrusion zone 3*a*.

(Exemplar Modification of External Structure of Sealed Vessel)

Figure 5:
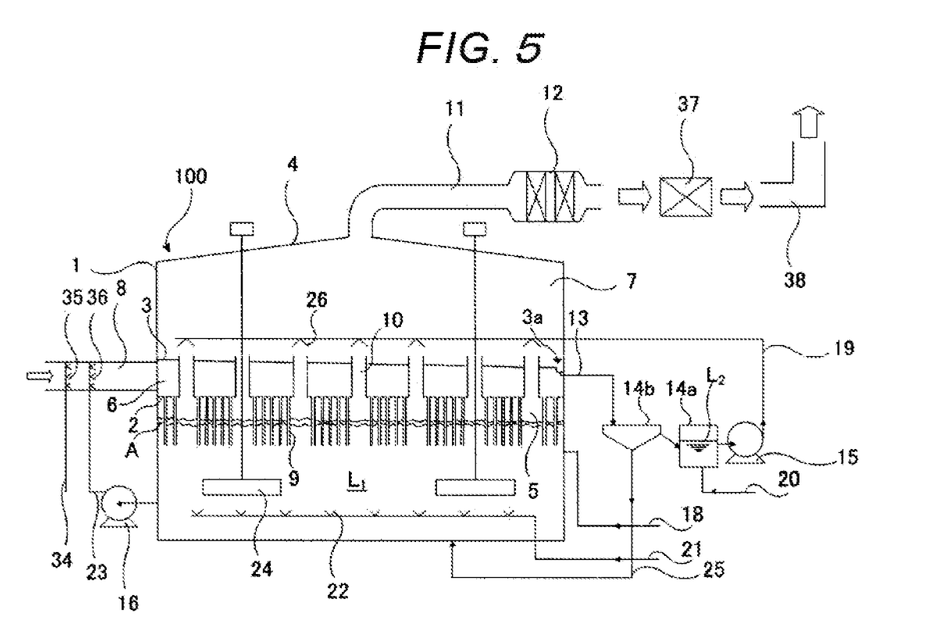
FIG. 5 is a schematic cross-sectional view of an exemplar modified external structure of the sealed vessel of the embodiment of flue gas desulfurization system of the present invention shown in FIG. 1, illustrating the configuration thereof.

FIG. 5 is a schematic cross-sectional view of an exemplar modified external structure of the sealed vessel 1 of the above-described embodiment of flue gas desulfurization system of the present invention shown in FIG. 1, illustrating the configuration thereof.

This modified external structure differs from the external structure shown in FIG. 1 in that a solid-liquid separator (thickener) 14*b* is added to the external arrangement of FIG. 1. More specifically, the circulation line for circulating cleansing solution $L_2$ of the modified external structure of the sealed vessel 1 shown in FIG. 5 differs from that of the external structure of the sealed vessel 1 shown in FIG. 1. Therefore, in the following description, the remaining part of the configuration shown in FIG. 5 that is the same as that of FIG. 1, including the configuration of the inside of the sealed vessel 1, will not be described repeatedly.

With the modified exemplar circulation line, the cleansing solution $L_2$ that is supplied onto the second partition board 3 and collected in the cleansing solution discharge pipes 13 is drawn out from the cleansing solution discharge pipes 13 and subsequently subjected to a solid-liquid separation process in the solid-liquid separator 14*b*. The solid-liquid separator 14*b* is designed to separate liquid and slurry that contains solids and the separated liquid is fed into the circulation line.

Note that the separated liquid is cleansing solution $L_2$ and the separated slurry contains both cleansing solution $L_2$ and solid components such as gypsum. The separated cleansing solution $L_2$ is led into the cleansing solution tank 14*a*, while the separated slurry is led into the absorber solution $L_1$ stored in the absorber solution chamber 5 by way of the conduit 25.

Then, the cleansing solution $L_2$ that is separated by the solid-liquid separator 14*b* is fed into the desulfurized flue gas inflow chamber 7 as proper cleansing solution $L_2$ by way of the cleansing solution storage tank 14*a* for storing cleansing solution $L_2$, the circulation pump 15 for circulating cleansing solution $L_2$ from the cleansing solution tank 14*a* and the cleansing solution feed pipe 19 coupled to the circulation pump 15.

Note that, with this modified exemplar circulation line, the cleansing solution feed pipe 19 may not need to have a branch structure because cleansing solution $L_2$ and solid component can be separated from each other by the solid-liquid separator 14*b* and hence the component composition of the cleansing solution $L_2$ that is circulated into the desulfurized flue gas inflow chamber 7 can constantly be held within a predetermined range.

Thus, as will be seen from the above-described embodiment and exemplar modifications, according to the present invention, it is possible to realize a flue gas desulfurization system that can suppress accumulation of solid components on the bottom surface of the desulfurized flue gas inflow chamber and provide an advantage of not requiring servicing operations of cleansing the bottom of the desulfurized flue gas inflow chamber.

This application claims the benefit of Japanese Patent Application No. 2015-238290, filed on Dec. 7, 2015, which is hereby incorporated by reference herein in its entirety.

REFERENCE SIGNS LIST

1: sealed vessel
2: first partition board
3: second partition board
3*a*: protrusion zone
3*b*: protrusion
4: ceiling board
5: absorber solution chamber
6: flue gas lead-in chamber
7: desulfurized flue gas inflow chamber
8: flue gas lead-in duct
9: flue gas dispersion pipe
10: gas flow pipe
11: desulfurized flue gas lead-out duct
12: mist eliminator
13: cleansing solution discharge pipe
14*a*: cleansing solution tank
14*b*: solid-liquid separator
15: circulation pump
16: circulation pump
18: absorber solution feed pipe
19: cleansing solution feed pipe
20: cleansing solution replenishing pipe
22: oxygen-containing gas spouting jet nozzle
23: absorber solution extraction pipe
24: stirrer
25: conduit
26: gas flow blocking plate
34: industrial water pipe
35: industrial water nozzle
36: absorber solution nozzle
37: heater
38: flue gas chimney
100: flue gas desulfurization system
$L_1$: absorber solution
$L_2$: cleansing solution
A: froth layer

The invention claimed is:

1. A flue gas desulfurization system for removing sulfur oxides from flue gas containing sulfur oxides, characterized by comprising:
   an absorber solution chamber which stores absorber solution so that the flue gas can be blown into the solution;
   a desulfurized flue gas inflow chamber for receiving the flue gas desulfurized in the absorber solution chamber and flowing therefrom;
   a gas flow pipe penetrating between the absorber solution chamber and the desulfurized flue gas inflow chamber so as to allow the desulfurized flue gas to pass through the pipe;

a cleansing solution feed pipe for feeding cleansing solution into the desulfurized flue gas inflow chamber; and at least one cleansing solution discharge pipe for discharging the fed cleansing solution from the desulfurized flue gas inflow chamber, the desulfurized flue gas inflow chamber having a bottom surface including a protrusion zone having a plurality of protrusions formed therein, each of the protrusions having a top surface at least part of which is inclined relative to the horizontal, the protrusion zone being located at a position lower than an adjacent surrounding area on the bottom surface of the desulfurized flue gas inflow chamber, the at least one cleansing solution discharge pipe being respectively arranged between two adjacently located ones of the protrusions.

2. The flue gas desulfurization system according to claim 1, characterized in that the bottom surface of the desulfurized flue gas inflow chamber has an edge where the protrusion zone is located.

3. The flue gas desulfurization system according to claim 1, characterized in that the bottom surface of the desulfurized flue gas inflow chamber is inclined relative to the horizontal.

4. The flue gas desulfurization system according to claim 3, characterized in that the inclined bottom surface has an angle of inclination relative to the horizontal which is not greater than 5°.

5. The flue gas desulfurization system according to claim 3, characterized in that the protrusion zone is located at a lower end of the inclined bottom surface as viewed in the direction of inclination.

6. The flue gas desulfurization system according to claim 1, characterized in that the gas flow pipe has a top end projected upward from the bottom surface of the desulfurized flue gas inflow chamber.

7. The flue gas desulfurization system according to claim 1, characterized by further comprising a cleansing solution tank for storing the cleansing solution discharged from the at least one cleansing solution discharge pipe such that the stored cleansing solution is fed into the desulfurized flue gas inflow chamber from the cleansing solution tank by way of the cleansing solution feed pipe.

8. The flue gas desulfurization system according to claim 1, characterized by further comprising a solid-liquid separator for separating the cleansing solution discharged from the at least one cleansing solution discharge pipe into liquid and solid-containing slurry such that the solid-containing slurry is fed into the absorber solution chamber and that the liquid is fed into the desulfurized flue gas inflow chamber as cleansing solution by way of the cleansing solution feed pipe.

9. The flue gas desulfurization system according to claim 1, characterized that it comprises a plurality of cleansing solution discharge pipes arranged such that any two adjacently located cleansing solution discharge pipes are apart from each other by a distance of not less than 300 mm and not more than 5,000 mm.

10. The flue gas desulfurization system according to claim 1, characterized in that the bottom surface of the desulfurized flue gas inflow chamber has a circular, square or rectangular shape.

* * * * *